Figure 1:
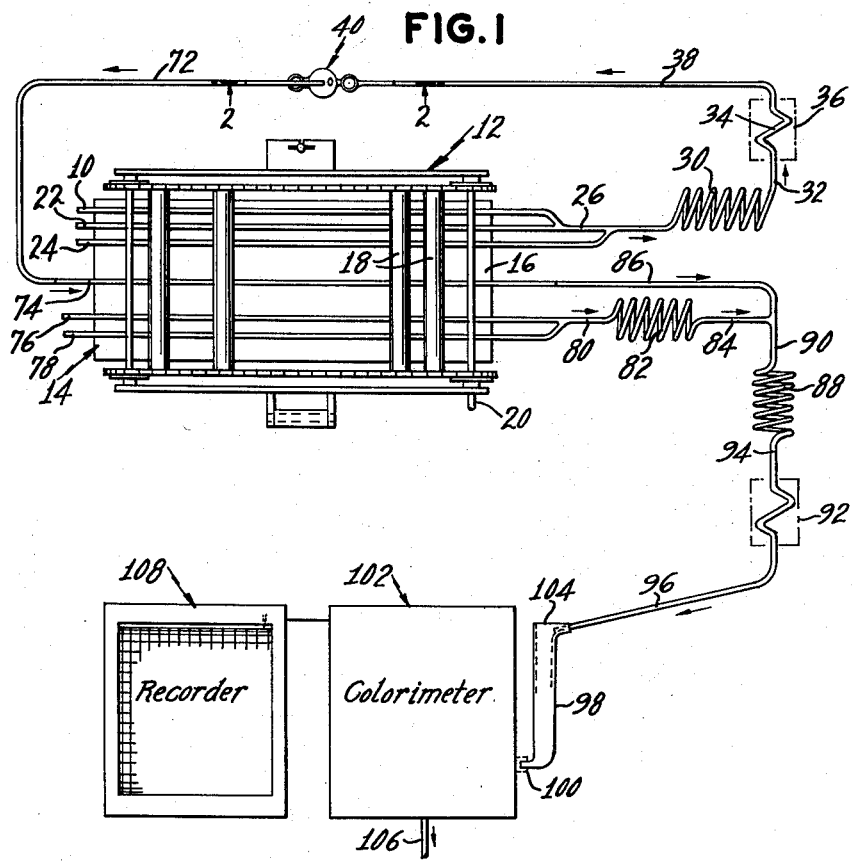

Jan. 7, 1964  A. FERRARI, JR  3,116,754
FLUID TREATMENT APPARATUS
Filed March 17, 1959  2 Sheets-Sheet 1

INVENTOR.
Andrés Ferrari, Jr.
BY
ATTORNEYS

Jan. 7, 1964  A. FERRARI, JR  3,116,754
FLUID TREATMENT APPARATUS
Filed March 17, 1959  2 Sheets-Sheet 2

INVENTOR.
Andrés Ferrari, Jr.
BY
ATTORNEYS 3,116,754
FLUID TREATMENT APPARATUS
Andrés Ferrari, Jr., Scarsdale, N.Y., assignor to Technicon Instruments Corporation, Chauncey, N.Y., a corporation of New York
Filed Mar. 17, 1959, Ser. No. 799,884
7 Claims. (Cl. 137—583)

This invention relates to apparatus and systems for automatic quantitative analysis, monitoring, process controls, etc., of various fluids in respect to a constituent substance therein.

One object of the present invention is the provision in apparatus for the continuous treatment of fluids, of means for relieving excess pressure or pressure variations which may occur in the course of the treatment of the fluids for analysis or other purposes.

Another object of the present invention is the provision, in a fluid treatment apparatus or system having a plurality of conduits for transmitting proportional quantities of fluids, of means for relieving excess pressure or pressure variations in any one of said conduits to permit continuous mixing of proportional quantities of said fluids.

A further object of the present invention is to provide apparatus of the indicated character with pressure relieving means for reducing the pumping load requirements of the apparatus.

The above and other objects, features and advantages of the present invention will be more fully understood from the following description considered in connection with the accompanying illustrative drawings.

In the drawings:

FIG. 1 is a more or less diagrammatic view of an apparatus of the present invention for processing a fluid for determining the quantity of a substance in said fluid for analysis, monitoring, etc.

Figure 2:
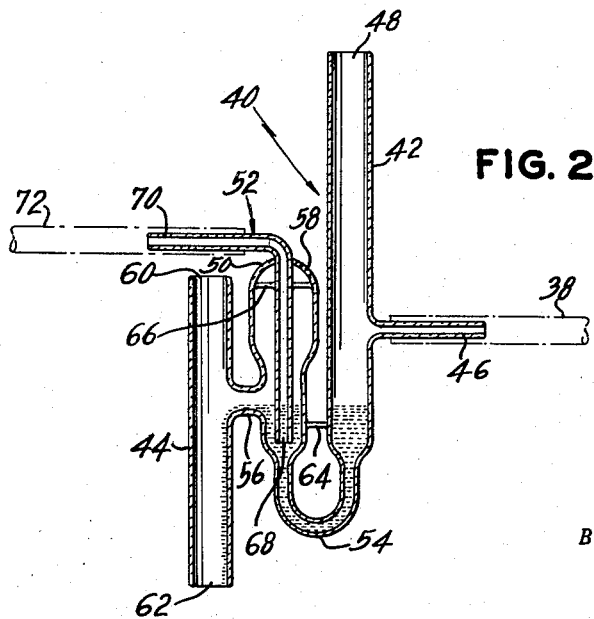
Figure 3:
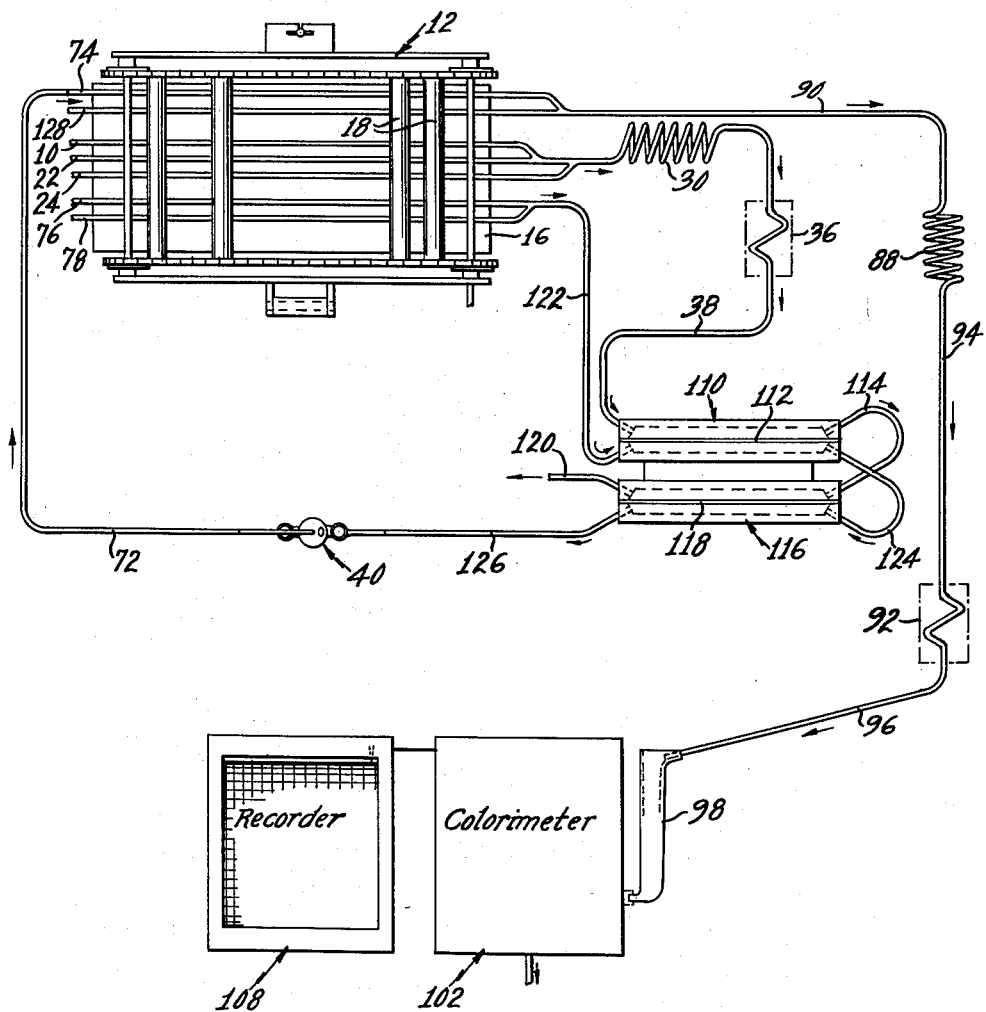

FIG. 2 is a vertical sectional view, on an enlarged scale, taken on line 2—2 of FIG. 1, showing the pressure relieving means of this invention, and FIG. 3 is a more or less diagrammatic view of apparatus in accordance with the present invention similar to the apparatus of FIG. 1 but provided with means for separating waste or other matter from the fluid to be processed for analysis or other purposes.

According to the invention, pursuant to the objects thereof, liquid which is to be treated for analysis or for monitoring or other purposes is caused to flow in a first conduit and from said first conduit to a second conduit for treatment with a reagent introduced into the second conduit, and liquid-receiving and transfer means vented to the atmosphere is interposed in the line of flow of the liquid between the two conduits. This liquid-receiving and transfer means may be used for various purposes; for example, to relieve pressure or pressure variations on the liquid before it is transferred to the second conduit, or to facilitate the transfer of only a part of the liquid from the first conduit to the second conduit, or for both of these purposes.

In accordance with another aspect of the invention, air or other gas is introduced into said first conduit for dividing the stream of liquid therein into spaced flowing segments of liquid separated by segments of the air or gas, and the vent of the liquid-receiving and transfer means removes the air or gas from the liquid during its flow so that a consolidated stream of the liquid free of the air or gas segments is discharged from said liquid-receiving and transfer means.

In accordance with the present invention, briefly described with respect to the treatment of a fluid requiring the heating and subsequent mixing of reagents therewith, a flowing stream of the fluid under treatment is mixed with a reagent and heated in a thermostatically controlled heater for effecting or accelerating the reaction between the fluid being treated and the reagent. As a result of the heating of the fluid and reagent, pressure variations in the form of surging pressures will occur in said mixture due to the intermittent action of the heater under the control of the thermostat. Since the reacted fluid, in the form of a flowing stream, must subsequently be mixed with proportional quantities of a processing reagent, also in the form of a flowing stream, the surging pressures of the fluid prevent the proper quantities of the fluid and reagent from mixing with each other or interfere in other ways with the proper operation of the apparatus. In accordance with the present invention pressure relieving means is provided for obviating the effect of such pressure surging, and at least a portion of said pressure relieved fluid is pumped through the apparatus for treatment for colorimetric analysis. This treated fluid is then subjected to examination in a colorimeter of the flow cell type, and a recorder is operated under control of the colorimeter in a well known manner, for providing a permanent record of the analysis of the fluid with respect to the substance contained therein.

Pursuant to another aspect of the invention, pressure relieving means is provided in an apparatus for the continuous treatment of fluids to relieve pressure variations in the form of excess pressures occurring in said apparatus due to the frictional resistance offered by treating elements of the apparatus to the flow of fluids therethrough.

Referring now to the drawings in detail, a sample fluid to be analyzed or treated is supplied from a source, not shown, to a tubular conduit 10 and is caused to flow therethrough by a proportioning pump indicated diagrammatically at 12. Said proportioning pump is preferably of the type disclosed in U.S. Patent No. 2,893,324 issued July 7, 1959. Briefly described, said pump comprises a plurality of resilient flexible tubes, generally indicated by reference numeral 14, which are simultaneously and progressively compressed along their lengths against a platen 16 by a plurality of pressure rollers 18, carried by an endless conveyor 20, and moved by the latter longitudinally of said tubes to pump proportional quantities of fluids therethrough, depending upon the internal diameter or lumens, respectively, of said tubes and the linear speed of said rollers longitudinally of the tubes. The tubes have internal diameters which may be the same or different, according to the required metering of the fluids pumped therethrough, respectively, but have the same wall thickness in order that they may be fully compressed simultaneously by the pressure rollers irrespective of the internal diameters of the tubes.

The fluid samples flowing in pump tube 10 may be divided into alternate segments of liquid and gas by the introduction of air or other inert gas through pump tube 22, as described in United States patent to Skeggs, No. 2,797,149. As described in said patent, the division of the fluid sample stream into small flowing segments of liquid separated by intervening flowing segments of an inert gas or air is effective to prevent particles of the liquid or substances therein from adhering to the inner walls of the tubes of the apparatus by wiping said walls during the flow thereof in said tubes, thereby preventing contamination of one liquid segment by the other. It will be understood that the fluid sample may be derived from a conduit or apparatus in an industrial plant as a continuous flowing stream, or a series of separate or individual quantities of said fluid sample may be supplied automatically in succession to pump tube 10 by suitable apparatus, preferably the apparatus of the type disclosed in United States Patent No. 3,038,340 issued June 12, 1962. In the latter case, each of the individual quantities of liquid samples will be separated from each other by an air segment.

A suitable processing fluid or reagent is supplied to pump tube 24 and joins the subdivided fluid sample stream flowing in the tube 26 which is in fluid communication with a helical mixing coil 30, which is preferably made of glass, for the mixing therein of the fluid sample and the reagent. The mixed fluids then flow from the mixing coil 30, via tube 32, through a coil 34, immersed in a heating bath, indicated at 36, which is operated under the control of a thermostat (not shown). Due to the intermittent heating action of the heating bath under the control of the thermostat, fluid pressure variations or surgings occur in the fluid conduit and if not eliminated or sufficiently reduced interfere with the subsequent treatment of the fluid. For relieving said surging pressures or pressure variations which would otherwise interfere with the proper mixing of proportional quantities of the reacted fluids flowing in tube 38 with another processing fluids or reagents to complete the treatment of the fluid samples, the pressure surging fluids in tube 38 are transmitted to the liquid-receiving and transfer means 40 which constitute the pressure relieving means of my invention.

As clearly illustrated in FIG. 2, the pressure relieving means 40 comprises a tubular member, preferably of glass, having a vertically extending tubular inlet part 42 providing a chamber for the incoming fluid, and a vertically extending tubular outlet part 44 laterally disposed therefrom, said inlet part having an extending nipple portion 46 connected to tube 38 through which the fluid stream, containing the pressure surging reacted fluids are fed to the inlet part 42. It will be noted that inlet part 42 is open at its upper end portion 48 for venting and relieving the varying surging pressures of the fluid stream flowing into the inlet part of the pressure relieving means and also to vent the air bubbles or segments that may exist between the various liquid segments of the flowing stream for the elimination thereof. Disposed between the inlets and outlets of pressure relieving means 40 is an intermediate tubular part 50 constituting a chamber or receptacle to receive and collect the liquid and provided with an integral aspirating or outlet tube 52, concentrically disposed within said tubular part, said aspirating tube being adapted to permit the transmission of at least a portion of the pressure relieved fluid to the apparatus for the subsequent treatment thereof. The lower portions of tubular parts 42 and 50 are in fluid communication with each other, via reflexed neck portion 54, and tubular parts 50 and 44 are in fluid communication with each other, via horizontally extending tubular part 56, said tubular part acting as a dam for controlling the level of the fluid in the pressure relieving means. Chamber 50 is provided with a vent 58 and outlet part 44 is also provided with a vent opening 60, which is in vertical alignment with outlet 62, the vents of the pressure relieving means permitting the equalization of the hydrostatic pressures in the various parts thereof to permit smooth flow of the fluids therethrough. An integral reinforcing rib 64 is provided between inlet part 42 and intermediate part 50, and integral reinforcing ribs 66 are provided between aspirating tube 52 and the inner walls of said intermediate part 50. It will be noted that the inlet end 68 of aspirating tube 52 is below the dam or tubular part 56 so that said inlet end will be below the level of the fluid in the pressure relieving means to prevent the introduction of air into said aspirating tube. To insure that the level of the fluid does not fall below the inlet end 68 of the aspirating tube, the volume of fluid aspirated through tube 52 by pump 12 should be slightly less than the total volume introduced into the pressure relieving means, the excess volume of fluid being discharged through the outlet 62. As indicated above, it will be understood that the quantities of the fluids flowing through the various conduits of the apparatus is determined by the sizes of the flexible tubes 14 of the proportioning pump 12 and the linear speed thereof.

The outlet 70 of aspirating tube 52 is connected, by conduit 72 to pump tube 74, whereby at least a portion of the fluid flowing to pressure relieving means 40 is transmitted therefrom for the subsequent treatment thereof, the pressure surging of said fluid having been relieved in said pressure relieving means. Suitable processing fluids or reagents may be supplied to each of pump tubes 76 and 78 for transmission, by said pump, to a conduit 80 for transmission to a mixing coil 82, and from said mixing coil the mixed reagents flow through conduit 84 to join the pressure relieved fluid flowing in conduit 86. It will be apparent from the foregoing that if the pressure of the fluids in conduit 86 were varying with respect to the pressure of the fluids in conduit 84, the flowing fluid streams in the conduits would not join each other smoothly and regularly resulting in disproportionate quantities of reagent and fluid samples being mixed in mixing coil 88, the joined streams being transmitted thereto via conduit 90. The resulting mixed fluid stream, comprising reacted fluid samples and reagents is transmitted to a heating bath 92, via conduit 94, wherein the final color of the fluid stream is developed. From heating bath 92, the fluid stream flows through conduit 96 to the upper end of a blender tube or chamber 98, which is connected, at its lower end 100, to the flow cell or flow cuvette of a colorimeter 102. Blender tube 98 is provided with a vented outlet 104, at the upper end thereof, to vent any air or gas segments or bubbles which may be present in the fluid stream flowing in conduit 96. It will be understood that the reagents flowing in conduit 80 may be subdivided by a flowing stream of air or inert gas introduced thereat, if so desired, and in such a case, the introduced air will be vented through outlet 104 of chamber 98, the resulting liquid segments being blended together in said chamber. After having passed through the colorimeter, wherein the color density of the fluid stream is measured, said fluid stream is discharged from the colorimeter through outlet 106. The results of the colorimetric measurements are recorded on a recorder indicated at 108. It will be understood that recorder 108 is operable under the control of a photo-tube circuit of the colorimeter 102, in a well known way, for controlling the operation of the recorder which is of the self-balancing slide wire type. As colorimeters and recorders of the type just referred to are well known and do not, per se, form part of the present invention, it is considered that further description of either the colorimeter or of the recorder is unnecessary.

The apparatus shown in FIG. 1, while useful for other purposes, is especially well adapted to determine the quantities of sugars present in the condensate of a steam installation wherein the condensate is used as feed water for the steam boilers of the installation. In the manufacture of sugar, steam is provided for operating various equipment and for various processes. This steam, in the form of condensate, is used as feed water for the steam boilers of the installation and it will be readily apparent that small amounts of sugar may be dissolved in said feed water to cause serious damage to the boilers of the installation. When the apparatus is used for this purpose the feed water samples are supplied to tube 10, and a 2 N solution of sulphuric acid is supplied to pump tube 24, pump tube 22 being used to furnish a flowing stream of air for segmentizing or dividing the feed water samples flowing in pump tube 10. The feed water and sulphuric acid are mixed in mixing coil 30 and heated in heating bath 36, preferably operated at a temperature of 95° C. wherein, in said heating bath, the fluid samples are hydrolyzed to invert the non-reducing sugars contained in the feed water samples to reducing sugars, the treatment of the feed water samples being for the determination of the total quantities of sugar contained therein. To relieve the surging pressures occurring due to the action of the thermostatically controlled heater, the hydrolyzed samples of feed water are transmitted to the pressure relieving means 40, wherein the pressure is relieved, and at least a portion of the hydrolyzed feed water is aspirated therefrom by proportioning pump 12, via tube 52 and conduit 72 to join a mixed stream of an alkaline solution of potassium ferricyanide ($K_3Fe(CN)_6$) and potassium cyanide (KCN) flowing in conduit 84. The alkaline potassium ferricyanide solution consists of a mixture of 0.075 percent of potassium ferricyanide in water with a 2 N solution of sodium hydroxide (NaOH). The quantities of reagents employed are not critical and enough potassium ferricyanide should be used for reduction thereof to potassium ferrocyanide by all of the sugars contained in the feed water under analysis. Other alkalies, besides sodium hydroxide may be used for alkalizing the potassium ferricyanide and, for hydrolyzing the feed water samples containing sugars, other acids may be used besides sulphuric acid.

The alkaline potassium ferricyanide solution is supplied to pump tube 76 and the potassium cyanide is supplied to pump tube 78, the reagent solutions being mixed together in mixing coil 82 and transmitted therefrom, via conduit 84, to join the flowing stream of the hydrolyzed feed water samples and mixed therewith in mixing coil 88, wherein the sugars contained in the feed water samples commence to react with the potassium ferricyanide to reduce said potassium ferricyanide, which is yellow in color, to potassium ferrocyanide which is colorless, the amount of the color change being proportional to the quantities of the sugars contained in the feed water. The rate of this reaction is increased in the heating bath 92, the potassium cyanide acting as a catalyst for rendering the potassium ferricyanide more sensitive to the sugars contained in the feed water samples. The color change is measured in the colorimeter 102 and recorded by recorder 108, wherein a record of the quantities of the total sugars in the feed water is obtained.

The following is a preferred but non-limitative example in respect to the proportions of fluids supplied by proportioning pump 12 for determining the quantities of sugars contained in boiler feed water. The feed water to be analyzed or treated in respect to the sugars contained therein is pumped through tube 10 at the rate of 2.5 ml. per minute; the air is pumped through tube 22 at the rate of 4 ml. per minute; the solution of sulphuric acid is pumped through tube 24 at the rate of 0.8 ml. per minute; the hydrolyzed feed water containing the sugars is pumped through tube 74 at the rate of 2.5 ml. per minute; the alkaline potassium ferricyanide solution is pumped through tube 76 at the rate of 1.6 ml. per minute; and the potassium cyanide is pumped through tube 78 at the rate of 0.8 ml. per minute.

This apparatus is also especially well adapted for the analysis of a broth in respect to an anti-biotic substance therein. In using the apparatus of FIG. 1 for the determination of an anti-biotic in a broth, for example, tetracycline or chlorotetracycline, the sample broth is supplied to tube 10 and a suitable hydrolyzing acid, such as a 4 N solution of sulphuric acid ($H_2SO_4$) is supplied to pump tube 24 and air for dividing the sample stream is furnished to pump tube 22. The divided fluid stream consisting of liquid segments of sample broth and sulphuric acid separated by air segments is transmitted to mixing coil 30 and heating bath 36 wherein the broth samples are hydrolyzed. It will be understood that where no chlorotetracycline is present in the sample broth the hydrolyzing step may be eliminated and pump tube 24 may be supplied with distilled water in lieu of the sulphuric acid. After hydrolyzing, the divided fluid stream is transmitted to the pressure relieving means 40 wherein the air segments are eliminated and at least a portion of the hydrolyzed broth containing the anti-biotic is aspirated from the pressure relieving means by the proportioning pump and transmitted through pump tube 74 to join a stream flowing in conduit 84 of a suitable acid, such as a 1 N solution of hydrochloric acid (HCl). Pump tube 78 and mixing coil 82 are eliminated from the apparatus when the apparatus is employed for the quantitative determination of tetracycline or chlorotetracycline in a broth. The fluid stream consisting of the hydrolized sample broth and the hydrochloric acid is then mixed in mixing coil 88 and transmitted to heating bath 92 wherein the color producing reaction occurs to form a yellow color in the fluid stream indicative of the quantity of tetracycline in the sample broth, said color being measured in colorimeter 102 and recorded on recorder 108 in the same manner as previously described. Accordingly, it will be apparent from the foregoing that the apparatus of FIG. 1, with a slight modification, as indicated, may be used to determine the quantity of the anti-biotics tetracycline or chlorotetracycline in a fluid medium or broth and the surging pressures of the fluid samples due to the action of the heating bath 36 may be relieved by passing the fluid samples through the pressure relieving means 40.

The following is a preferred but non-limitative example of the proportions of fluids supplied by the proportioning pump 12 for the determination of the anti-biotic tetracycline or chlorotetracycline in a fluid medium or broth. The broth to be analyzed or treated in respect to the anti-biotic tetracycline or chlorotetracycline contained therein is pumped through pump tube 10 at the rate of .52 ml. per minute; air is pumped through pump tube 22 at the rate of .70 ml. per minute; distilled water or sulphuric acid is pumped through pump tube 24 at the rate of 2.0 ml. per minute; the pressure relieved sample fluid is pumped through pump tube 74 at the rate of 1.5 ml. per minute; and the hydrochloric acid is pumped through pump tube 76 and tube 84 at the rate of 1.5 ml. per minute.

Referring now to FIG. 3, there is shown apparatus similar to FIG. 1 that may be employed for determining the quantity of a substance in a fluid such as, for example, total sugars in waste or sewer waters in sugar refineries. It will be noted in FIG. 1 that two heating baths are provided between which processing fluids or reagents are introduced into a flowing stream of a fluid sample, the first heating bath causing surging pressures in the fluid sample stream preventing the proportional mixing of said stream with the subsequently introduced reagents, said surging pressures being relieved by the pressure relieving means previously described. In the apparatus of FIG. 3, no substantial surging pressures that will interfere with the proportional mixing of a fluid sample and a reagent normally occurs but due to the various elements in the apparatus for the treatment of the fluid samples, high resistance to fluid flow is encountered by some of the flowing streams of fluids resulting in high pressures in those conduits containing said elements causing resistance to fluid flow. Accordingly, pressure relieving means 40 may be inserted in any fluid line having high pressures to relieve and reduce the pressures therein and at least a portion of the fluid in that line, at the reduced pressure, is transmitted back to the proportioning pump for the subsequent treatment thereof.

For determining the quantities of total sugars contained in waste and sewer waters in sugar refineries the fluid sample is treated initially the same as the fluid samples of FIG. 1, as previously described with respect to the quantities of sugars contained in boiler feed water. The waste or sewer waters, with respect to which the quantity of total sugars contained therein is to be determined, is supplied to pump tube 10, air is supplied to pump tube 22 and sulphuric acid is supplied to pump tube 24 and transmitted to the mixing coil 30 and the heating bath 36 wherein the hydrolyzing reaction takes place. The hydrolyzed samples are transmitted through conduit 38, through a tubular passage of dialyzer 110, at the upper side of the dialyzer membrane indicated at 112, and from said dialyzer through conduit 114, through a tubular passage of another dialyzer 116, at the upper side of the dialyzer membrane therein indicated at 118, and then to the discharge conduit 120, said dialyzers being arranged in series. Each of the dialyzers is preferably of the type shown and described in U.S. Patent No. 2,864,507. The dialyzer membranes 112 and 118 act to hold back contaminants in the sample waste and sewer waters and provide a convenient and advantageous means to diffuse at least a portion of the total sugars contained in the fluid samples, the quantities of the sugars being diffused being in proportion to the quantities contained in the fluid sample. It will be noted that the fluid samples pass through a mixer and a heating coil and through a plurality of dialyzers, said elements offering substantial resistance to the flow of the fluid samples through said elements. Accordingly, if necessary in order to relieve objectionably excessive pressures created in this part of the system a pressure relieving means 40 may be inserted in conduit 38 to reduce the excess pressures in said conduit, and at least a portion of the fluid, at the relieved or reduced pressure, may be transmitted back to the proportioning pump and pumped therefrom to dialyzer 110, at the upper side of membrane 112. However, since the outlet is normally open to atmosphere, the pressure relief means 40 in this part of the system is normally unnecessary.

A divided or segmented fluid stream of potassium ferricyanide ($K_3Fe(CN)_6$) is transmitted to dialyzer 110, at the lower side of membrane 112 thereof, said segmented potassium ferricyanide stream acting as a liquid diffusate to receive the sugars diffused through membrane 112. The divided diffusate liquid stream is transmitted to dialyzer 110, via pump tube 76, which carries potassium ferricyanide and pump tube 78, which carries air or another inert gas, the fluids joining and being transmitted to the dialyzer 110, at the lower side of membrane 112 thereof, via conduit 122. The diffusate segmented fluid stream is transmitted to dialyzer 116, at the lower side of dialyzer membrane 118 thereof, via conduit 124, to receive more sugars diffused through membrane 118, and is transmitted from said dialyzer to pressure relieving means 40, via conduit 126, wherein at least a portion of the diffusate fluid containing the diffused sugars is transmitted to pump tube 74, via conduit 72, for subsequent treatment thereof. Potassium cyanide (KCN) is supplied to pump tube 128, from a source not shown, joins the diffusate fluid from pump tube 74, and is transmitted to mixing coil 88 and heating coil 92 via conduits 90 and 94, respectively, wherein the color producing reaction occurs producing a color indicative of the quantity of total sugars in the waste and sewer water samples, in exactly the same manner as previously described with respect to the determination of total sugars in boiler feed water, said color being measured and recorded respectively in colorimeter 102 and recorder 108. It will be apparent that if pressure relieving means 40 were not provided and the diffusate fluid were led directly from dialyzer 116 to mixing coil 88 and heating coil 92, substantial pressures would have been created in the fluid flowing through said elements due to the resistance offered by said elements to fluid flow. Accordingly, by providing the pressure relieving means in the conduit in fluid communication with these elements the creation of these excess pressures has been prevented.

The quantities and reactions of the fluids involved in the determination of the quantity of total sugars in waste and sewer waters are similar to the quantities and reactions previously discussed with respect to the determination of the quantities of total sugars in boiler feed water. It will be understood that pressure relief means 40 may be placed in any one of the conduits carrying a fluid wherein the pressure of said fluid is excessive due to the resistances offered by the elements in fluid communication with the fluid in said conduits.

While I have shown and described the preferred embodiment of my invention, it will be understood that the invention may be embodied otherwise than as herein specifically illustrated or described, and that in the illustrated embodiment certain changes in the details of construction and in the form and arrangement of parts may be made without departing from the underlying idea or principles of this invention within the scope of the appended claims.

Having thus described my invention what I claim and desire to secure by Letters Patent is:

1. In an apparatus or system in which a stream of liquid is subjected to treatment in the course of its flow through the apparatus and which is provided with means for pumping said liquid and at least one processing fluid, means provided in said apparatus for relieving excess fluid pressure or pressure variations occurring in a part of the system as an incident of the fluid treatment therein, said pressure relief means comprising a chamber having a liquid inlet and a liquid outlet and a vent opening for the relief of pressure on the liquid in said chamber, said liquid inlet being in flow communication with said part of the apparatus to receive treated liquid therefrom, said liquid outlet being in fluid flow communication with said pumping means for the pumping of pressure relieved liquid from said chamber to another part of the apparatus, said pressure relief means comprising means to vent air or other gas from said liquid before the flow of the liquid into said chamber, said liquid outlet being in communication with the interior of said chamber at a point below the level of the liquid in said chamber in the operation of the apparatus, said pressure relief means being provided with an auxiliary liquid outlet for the discharge of liquid in excess of the quantity of liquid pumped from said chamber through said first mentioned outlet, said auxiliary outlet being above said point of communication of said first mentioned outlet with the interior of the chamber so that liquid may rise in said chamber to the level of said auxiliary outlet.

2. Liquid-receiving and transfer means adapted to be interposed in the line of flow of a liquid from a first conduit to a second conduit, comprising a vented first chamber provided with an inlet to receive liquid from said first conduit, a second chamber in fluid flow communication with said first chamber for receiving liquid from said first chamber, said second chamber being provided with a first liquid outlet for the transmission of liquid from said second chamber to said second conduit, and a second liquid outlet above said first liquid outlet for the discharge of excess liquid from said second chamber.

3. Liquid-receiving and transfer means adapted to be interposed in the line of flow of a liquid from a first conduit to a second conduit, comprising a vented first chamber provided with an inlet to receive liquid from said first conduit, a second chamber in fluid flow communication with said first chamber for receiving liquid from said first chamber, said second chamber being provided with a liquid outlet for the transmission of liquid from said second chamber to said second conduit, and a second liquid outlet for the discharge of excess liquid from said second chamber, said first liquid outlet comprising a tube disposed within said second chamber below the level of said second liquid outlet.

4. Liquid-receiving and transfer means adapted to be interposed in the line of flow of a liquid from a first conduit to a second conduit, comprising a vented first chamber provided with an inlet to receive liquid from said first conduit, a second chamber in fluid flow communication with said first chamber for receiving liquid from said first chamber, said second chamber being provided with a liquid outlet for the transmission of liquid from said second chamber to said second conduit, a second liquid outlet for the discharge of excess liquid from said second chamber, said first liquid outlet comprising a tube disposed within said second chamber below the level of said second liquid outlet, and a tubular member having an inlet connected to said second liquid outlet and having an outlet for the discharge of excess liquid from said second chamber, said tubular member having a vent opening above said inlet thereof.

5. Apparatus for the continuous treatment of a liquid, comprising a first conduit for transmitting a stream of said liquid, a second conduit for transmitting at least a portion of said liquid in the form of a stream from said first conduit, and liquid-receiving and transfer means connecting said first and second conduits in liquid-flow communication with each other, said liquid-receiving and transfer means comprising a first chamber having an inlet connected to said first conduit and a vent opening above said inlet for venting said first chamber, a second chamber connected in liquid flow communication with said first chamber for the flow of liquid from said first chamber to said second chamber, said second chamber having an outlet opening for the liquid to maintain a predetermined level of liquid in said second chamber and to provide an outlet for the flow of excess liquid from said second chamber, an outlet tube having an inlet end positioned in said second chamber below said outlet opening and having a part extending from said second chamber and connected to said second conduit for the transfer of at least a portion of the liquid from said second chamber to said second conduit, and pump means connected to said second conduit for withdrawing at least a portion of the liquid from said second chamber through said outlet tube and through said second conduit.

6. Apparatus for the continuous treatment of a liquid, comprising a first conduit for transmitting a stream of said liquid, a second conduit for transmitting at least a portion of said liquid in the form of a stream from said first conduit, and liquid-receiving and transfer means connecting said first and second conduits in liquid-flow communication with each other, said liquid-receiving and transfer means comprising a first chamber having an inlet connected to said first conduit and a vent opening above said inlet for venting said first chamber, a second chamber connected in liquid flow communication with said first chamber for the flow of liquid from said first chamber to said second chamber, said second chamber having an outlet opening for the liquid to maintain a predetermined level of liquid in said second chamber and to provide an outlet for the flow of excess liquid from said second chamber, said second chamber having a vent opening positioned about said outlet opening, an outlet tube having an inlet end positioned in said second chamber below said outlet opening and having a part extending from said second chamber and connected to said second conduit for the transfer of at least a portion of the liquid from said second chamber to said second conduit, and suction means connected to said second conduit for withdrawing at least a portion of the liquid from said second chamber through said outlet tube and through said second conduit.

7. Apparatus for the continuous treatment of a liquid comprising a first conduit for transmitting a stream of said liquid, a second conduit for transmitting at least a portion of said liquid in the form of a stream from said first conduit, and liquid-receiving and transfer means connecting said first and second conduits in liquid-flow communication with each other, said liquid-receiving and transfer means comprising a first chamber having an inlet connected to said first conduit and a vent opening above said inlet for venting said first chamber, a second chamber connected in liquid flow communication with said first chamber for the flow of liquid from said first chamber to said second chamber, said second chamber having an outlet opening for the liquid to maintain a predetermined level of liquid in said second chamber and to provide an outlet for the flow of excess liquid from said second chamber, a tubular passage connected to said outlet opening for receiving said excess liquid and having opposite open ends providing a vent opening and a liquid outlet for said excess liquid, respectively, an outlet tube having an inlet end positioned in said second chamber below said outlet opening and having a part extending from said second chamber and connected to said second conduit for the transfer of at least a portion of the liquid from said second chamber to said second conduit, and pump means connected to said second conduit for withdrawing at least a portion of the liquid from said second chamber through said outlet tube and through said second conduit.

References Cited in the file of this patent

UNITED STATES PATENTS

| | | |
|---|---|---|
| 1,156,907 | King | Oct. 19, 1915 |
| 2,202,346 | King | May 28, 1940 |
| 2,408,900 | Alston | Oct. 8, 1946 |
| 2,603,304 | Carrier | July 15, 1952 |
| 2,627,453 | Sheen | Feb. 3, 1953 |
| 2,797,149 | Skeggs | June 25, 1957 |
| 2,834,365 | Pair | May 13, 1958 |
| 2,967,764 | Skeggs | Jan. 10, 1961 |
| 2,976,761 | Whitehead | Mar. 28, 1961 |